US008682393B2

(12) United States Patent
You et al.

(10) Patent No.: US 8,682,393 B2
(45) Date of Patent: Mar. 25, 2014

(54) COMMUNICATION DEVICE AND METHOD FOR AUTOMATICALLY RECORDING NUMERIC INFORMATION IN SPEECH

(75) Inventors: Qiang You, Shenzhen (CN); Ren-Wen Huang, Shenzhen (CN); Yin-Zhan Wang, Shenzhen (CN); Yang Xin, Shenzhen (CN); Jun-Wei Zhang, Shenzhen (CN); Tsung-Jen Chuang, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/523,905

(22) Filed: Jun. 15, 2012

(65) Prior Publication Data
US 2013/0210492 A1   Aug. 15, 2013

(30) Foreign Application Priority Data

Feb. 14, 2012   (CN) .......................... 2012 1 0032322

(51) Int. Cl.
*H04B 1/38*   (2006.01)
*H04M 1/27*   (2006.01)

(52) U.S. Cl.
CPC .................. *H04M 1/271* (2013.01)
USPC ..... 455/563; 455/566; 455/550.1; 455/556.2; 704/231; 704/251; 704/270.1; 704/275; 704/10

(58) Field of Classification Search
USPC ............ 455/563, 566, 550.1, 556.2; 704/231, 704/251, 270.1, 275, 10
See application file for complete search history.

(56) References Cited

U.S. PATENT DOCUMENTS

| 4,761,815 | A * | 8/1988 | Hitchcock ..................... 704/253 |
| 5,845,246 | A * | 12/1998 | Schalk .......................... 704/243 |
| 5,848,130 | A * | 12/1998 | Rochkind ................. 379/88.01 |
| 6,246,988 | B1 * | 6/2001 | Schier .......................... 704/273 |
| 6,253,176 | B1 * | 6/2001 | Janek et al. ................... 704/231 |
| 6,418,328 | B1 * | 7/2002 | Shon ............................. 455/563 |
| 2004/0230435 | A1 * | 11/2004 | Douros ......................... 704/275 |

* cited by examiner

*Primary Examiner* — Khai M Nguyen
(74) *Attorney, Agent, or Firm* — Altis Law Group, Inc.

(57) ABSTRACT

A communication device includes a communication unit, a speech recognition module, and a processor. The communication unit builds a communication between the communication unit and an external communication device. The processor records speech between the communication device and the external communication device. The speech recognition module compares each word of the recorded speech with voice samples to determine whether numbers have been spoken. The processor further determines if successive numbers are recorded in a predetermined period, and stores the successive numeric in a storage unit.

13 Claims, 2 Drawing Sheets

COMMUNICATION DEVICE AND METHOD FOR AUTOMATICALLY RECORDING NUMERIC INFORMATION IN SPEECH

TECHNICAL FIELD

The present disclosure relates to a communication device which can record numeric information in speech, automatically.

DESCRIPTION OF RELATED ART

Many people have a communication device such as a mobile phone. Normally, when a user communicates with another person and the user need to record or write down numeric information, such as telephone numbers, bank account number, and personal identity (ID) numbers, from the other person, it is inconvenient for the user to record the numeric information by hand since the user holds the mobile phone to communicate with the other person.

Thus, a new communication device is desired to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include compact discs (CDs), digital video discs (DVDs), Blu-Ray disks, Flash memory, and hard disk drives.

Figure 1:
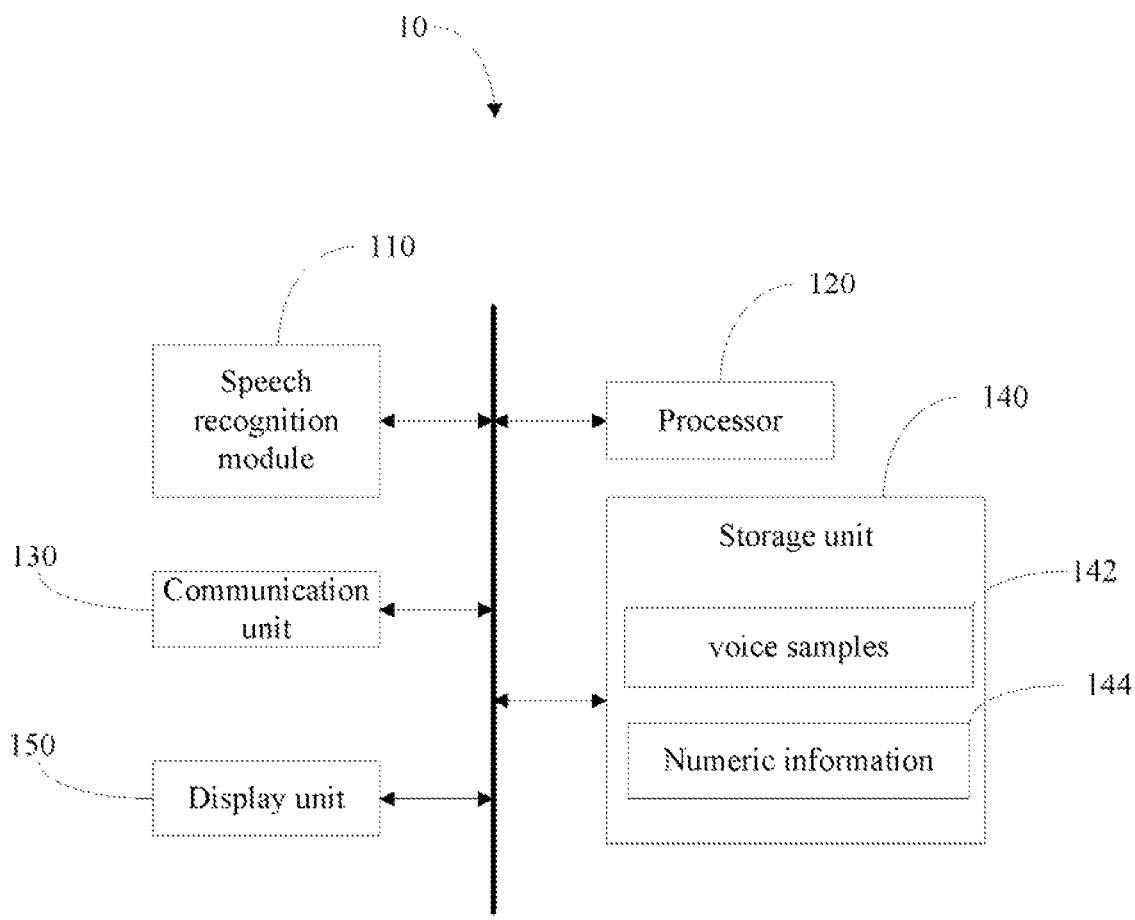
FIG. 1 is a block diagram illustrating one embodiment of a communication device.

FIG. 1 is a block diagram illustrating one embodiment of a communication device 10. The communication device 10 includes a speech recognition module 110, a processor 120, a communication unit 130, a display unit 150, and a storage unit 140.

The storage unit 140 stores a plurality of human speech samples or voice samples 142. In one embodiment, the speech or voice samples are the numbers zero through nine. In one embodiment, the storage unit 140 can be selected from a group consisting of CDs, DVDs, BLU-Ray disks, flash memory, and hard disk drives.

The communication unit 130 is configured to communicate with other communication devices that are the same or similar to the communication device 10. In one embodiment, the communication device 10 is a mobile phone. In one embodiment, the communication unit 130 may be selected from a group consisting of a global system for a mobile communication (GSM) device, a code division multiple access (CDMA) device, or a wide band CDMA (WCDMA) device.

The processor 120 records speech between the communication unit 130 and the external communication device, and provides the recorded speech and the voice samples to the speech recognition module 110.

The speech recognition module 110 is configured to recognize spoken numbers communicated between the communication unit 130 and the external communication device. In detail, the speech recognition module 110 compares each word in the recorded speech with the voice samples to determine whether the recorded speech includes spoken numbers, and provides the result of the comparison to the processor 120. If the word of the recorded speech matches voice samples, the processor 120 further counts successive words which are digits of the number, and then determines if the count is greater than a predetermined value. When the count is greater than the predetermined value, the processor 120 defines the successive numeric words recorded in a predetermined period to be numeric information 144 such as a phone number and stores the series of digits in the storage unit 140 as shown in FIG. 1. The processor 120 does not store numbers in the storage unit 140 when the count is less than the predetermined value. In one embodiment, the predetermined value may be three or seven and the predetermined period is 5 seconds.

The display unit 150 displays the numeric information 144 for the user. The display unit 150 may be a liquid crystal display (LCD) or an organic light emitting display (OLED).

Figure 2:
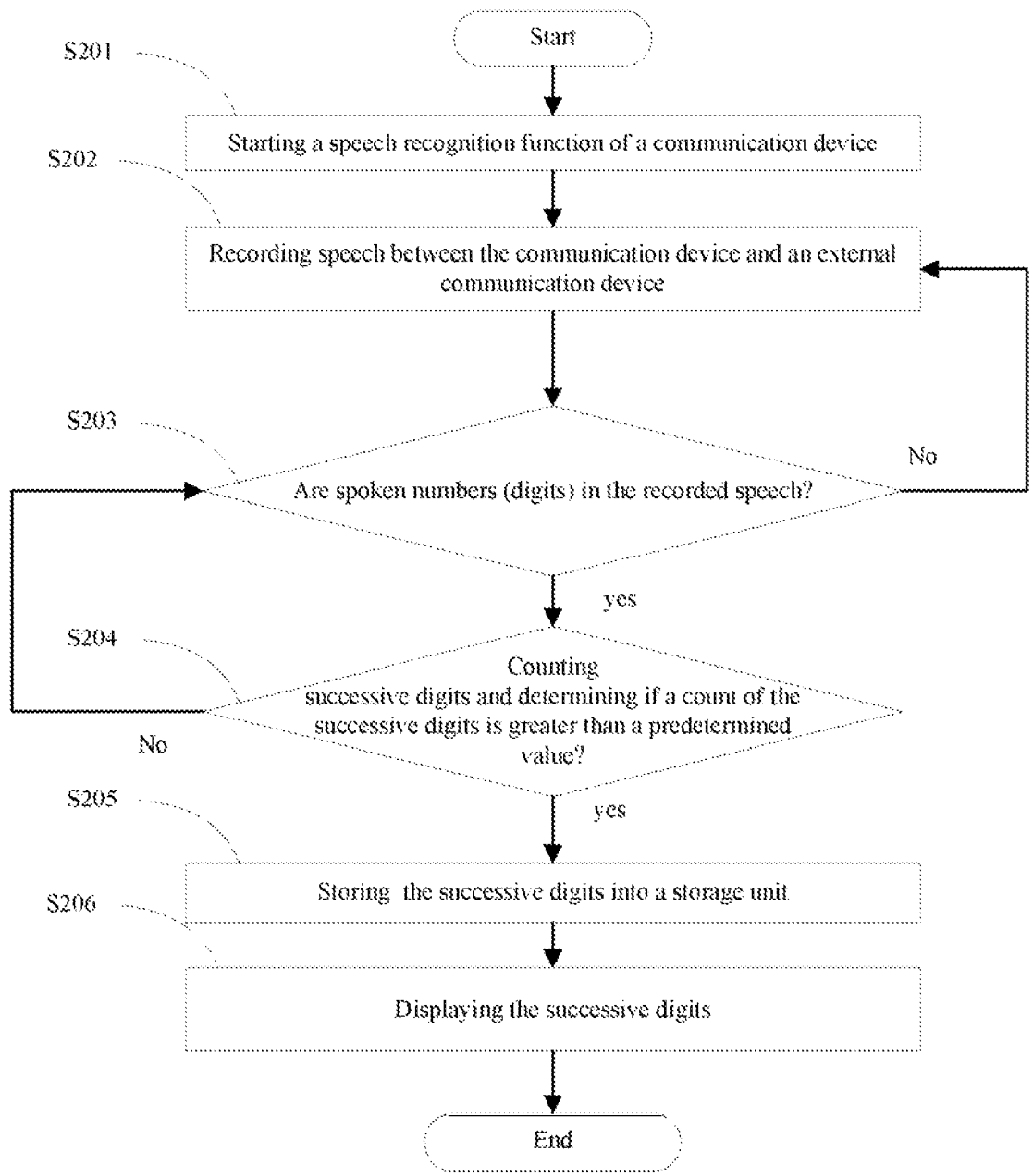
FIG. 2 is a flowchart of one embodiment of a method for automatically recording numeric information in speech.

FIG. 2 is a flowchart of one embodiment of a method for automatically recording numeric information in speech. The method is typically carried out using the communication device 10. Depending on the embodiment, additional steps may be added, others removed, and the ordering of the steps may be changed.

In step S201, the processor 120 starts a speech recognition function of the communication device 10, and controls the speech recognition module 110 to operate. In the embodiment, when the communication device 10 starts to communicate with an external communication device, the processor 120 starts the speech recognition module 110 to normally work.

In step S202, the processor 120 records speech between the communication device 10 and the external communication device, and provides the recorded speech and the voice samples to the speech recognition module 110.

In step S203, the speech recognition module 110 compares each word in the recorded speech with the voice samples to determine whether there are spoken numbers in the recorded speech. If the word of the recorded speech matches voice samples, step S204 is performed, otherwise, the procedure goes back to step S202.

In step S204, the processor 120 counts the successive digits in the predetermined period and when the count is greater than a first predetermined value, step S205 is performed, otherwise, step S203 is performed again. In one embodiment, the predetermined value is three. In other embodiment, the processor 120 automatically stops recording speech when the count is greater than a second predetermined value, such as eleven or eighteen.

In step S205, the successive digits are stored in the storage unit 140. In detail, the processor 120 defines the series of digits recorded in a predetermined period to be numeric information 144 and stores the numeric information 144 in the storage unit 140. In one embodiment, the predetermined period is equal to 5 seconds.

In step S206, the display unit 150 displays the numeric information for the user.

Even though numerous characteristics and advantages of certain inventive embodiments have been set out in the foregoing description, together with details of the structures and functions of the embodiments, the disclosure is illustrative only; and changes may be made in detail, especially in the matter of arrangement of parts within the principles of present invention to the full extent indicated by the broad general meaning of the terms in which the appended claims are expressed.

What is claimed is:

1. A communication device, comprising:
   a communication unit configured for communicating with an external communication device;
   a processor recording speech between the communication unit and the external communication device; and
   a speech recognition module comparing each word of the speech with voice samples to determine whether the speech comprises spoken numbers, and providing a result of the comparison to the processor, wherein the processor determines whether successive numeric words are in the recorded speech in a predetermined period, counts the successive words which are numbers, determines whether the count is greater than a predetermined value, and stores the successive numeric words into a storage unit when the successive numeric words are present and the count is greater than the predetermined value.

2. The communication device of claim 1, further comprising a display unit for displaying the successive numeric words.

3. The communication device of claim 2, wherein the display unit is a liquid crystal display (LCD) or an organic light emitting display (OLED).

4. The communication device of claim 1, wherein the predetermined value is three.

5. The communication device of claim 1, wherein the predetermined period is 5 seconds.

6. The communication device of claim 1, wherein the voice samples are the numbers zero through nine.

7. The communication device of claim 1, wherein the storage unit is selected from a group consisting of compact discs (CDs), digital video discs (DVDs), Blu-Ray disks, Flash memory, and hard disk drives.

8. The communication device of claim 1, wherein the communication unit is selected from a group consisting of a global system for a mobile communication (GSM) device, a code division multiple access (CDMA) device, or a wide band CDMA (WCDMA) device.

9. A method for automatically recording numeric information in speech, the method comprising:
   building a communication between a communication device and an external communication device by a communication unit of the communication device;
   recording speech of the communication between the communication unit and the external communication device by a processor of the communication device;
   comparing each word in the speech with voice samples to determine whether the speech comprises spoken numbers by a speech recognition module, and providing a result of the comparison to the processor;
   determining whether successive numeric words are present in the speech in a predetermined period by the processor of the communication device;
   counting the successive words which are numbers, and then determining whether the count is greater than a predetermined value; and
   storing the successive numeric words into a storage unit by the processor when the count is greater than the predetermined value.

10. The method of claim 9, further comprising:
    displaying the numeric information on a display unit of the communication device.

11. The method of claim 9, wherein the predetermined value is three.

12. The method of claim 9, wherein the predetermined period is 5 seconds.

13. The method of claim 9, wherein the voice samples are spoken examples of numbers zero through nine.

* * * * *